United States Patent
Fitzgerald

(10) Patent No.: US 7,873,863 B2
(45) Date of Patent: Jan. 18, 2011

(54) PORTABLE COMPUTING DEVICE WITH A NON-VOLATILE MEMORY DRIVE

(75) Inventor: Richard Colin Fitzgerald, Kenley (GB)

(73) Assignee: Nokia Corporation (FI)

( * ) Notice: Subject to any disclaimer, the term of this patent is extended or adjusted under 35 U.S.C. 154(b) by 149 days.

(21) Appl. No.: 10/561,325

(22) PCT Filed: Jun. 23, 2004

(86) PCT No.: PCT/GB2004/002725

§ 371 (c)(1),
(2), (4) Date: Dec. 20, 2005

(87) PCT Pub. No.: WO2004/114101

PCT Pub. Date: Dec. 29, 2004

(65) Prior Publication Data

US 2007/0168714 A1    Jul. 19, 2007

(30) Foreign Application Priority Data

Jun. 23, 2003    (GB)    ................... 0314623.0

(51) Int. Cl.
G06F 11/00    (2006.01)
(52) U.S. Cl. .......................................... 714/5
(58) Field of Classification Search .............. 714/42, 714/5; 713/1, 2
See application file for complete search history.

(56) References Cited

U.S. PATENT DOCUMENTS

| 6,279,109 | B1* | 8/2001 | Brundridge .................... 713/2 |
| 6,421,009 | B2* | 7/2002 | Suprunov .................... 342/465 |
| 6,532,535 | B1* | 3/2003 | Maffezzoni et al. ............ 713/1 |
| 6,591,376 | B1* | 7/2003 | VanRooven et al. ........... 714/36 |
| 6,853,710 | B2* | 2/2005 | Harris .................... 379/142.01 |
| 6,944,757 | B2* | 9/2005 | Wilks et al. .................... 713/2 |
| 6,992,991 | B2* | 1/2006 | Duske et al. ................ 370/316 |
| 2002/0142805 | A1* | 10/2002 | Pecen et al. ................. 455/558 |
| 2003/0070110 | A1 | 4/2003 | Gunnar et al. |
| 2003/0074550 | A1* | 4/2003 | Wilks et al. .................... 713/2 |
| 2003/0167261 | A1* | 9/2003 | Grust et al. .................... 707/3 |
| 2004/0128495 | A1* | 7/2004 | Hensley ........................ 713/2 |

FOREIGN PATENT DOCUMENTS

WO    WO 01/09722    2/2001

* cited by examiner

*Primary Examiner*—Scott T Baderman
*Assistant Examiner*—Yair Leibovich
(74) *Attorney, Agent, or Firm*—Alston & Bird LLP

(57) ABSTRACT

A portable computing device, in which an internal non-volatile memory drive that is used to boot to a functional device GUI is automatically swapped with a temporary RAM drive if the internal non-volatile memory drive is found to be corrupted. The non-volatile memory is typically Flash memory, but the principle of the present invention can be applied to any kind of non-volatile memory that could become corrupted. Default configuration files may be automatically copied to the RAM drive. These may, for example, allow at least emergency voice calls to be made.

25 Claims, 2 Drawing Sheets

PORTABLE COMPUTING DEVICE WITH A NON-VOLATILE MEMORY DRIVE

CROSS REFERENCE TO RELATED APPLICATIONS

This application claims the priority of PCT/GB2004/002725 filed on 23 Jun. 2004 and GB 0314623.0 filed on 23 Jun. 2003, the entire contents of which are hereby incorporated in total by reference.

FIELD OF THE INVENTION

This invention relates to portable computing devices with non-volatile (e.g. flash) memory drives that are used to boot the device to a functional GUI (graphical user interface)—i.e. load the necessary files for the device to display the device GUI so that the device is operational by a user.

DESCRIPTION OF THE PRIOR ART

Many portable computing devices, such as Smartphones, include some form of Flash non-volatile memory for internal data storage that is used to boot up to a functional device GUI (i.e. to a functional state that includes the graphical user interface). In many cases, this is the C: drive and the term "C: drive" will be used hereafter to mean the primary internal storage drive or medium for user and application data.

There are two possible types of Flash memory: NOR and NAND. Each has its own limitations and quirks. But the problems are essentially the same:

a) Flash wears out—despite attempts at "wear levelling" there is always the possibility that a part of the Flash that contained data will be found to have failed when that data is required.

b) The battery charge may drop below the minimum required to run the device while data is being written to the Flash and it cannot necessarily be assumed that there will be enough spare battery power to fully complete the write.

c) It is more likely that the battery will be removed from a mobile phone while it is switched on than with a PDA. For example, many mobile phones require the battery to be removed to get at the SIM card and it cannot be assumed that the user will turn the phone off before removing the battery.

d) There is a limit to how much protection can be added to the content of the Flash. There is always going to be a trade-off between the degree of protection and the time and data overhead required.

e) Using Flash as a medium can involve long-running cleanup operations, which we may prefer to abandon by turning the phone off, rather than wait for them to complete.

f) Glitches—power or data bus glitches, mainly during power up or down, can occasionally upset a Flash.

g) There could be defects in the code that implements protection of the data. This possibility should not be ignored.

h) One other point worth bearing in mind is the possibility of malicious code (viruses and the like) deliberately corrupting the drive.

Yet it is necessary to have a working C: drive in order to start enough code for the device to do anything useful. There are two conventional approaches to solving this:

a) redesign all the code so that is able to run without a C: drive, or b) if the C: drive is corrupt, automatically reformat it.

SUMMARY OF THE PRESENT INVENTION

In a first aspect of the invention, there is a portable computing device controlled by an operating system, in which, if the operating system is intact but an internal non-volatile memory drive that is used to boot the device to a functional GUI is found to be corrupted, then the non-volatile memory is automatically swapped with a temporary RAM drive to enable the operating system to boot.

A 'RAM drive' is a portion of device RAM that provides the same data storage capabilities as the non-volatile memory (typically Flash memory, as explained above) but is volatile. In the present invention, it uses part of the device RAM to store the files and data needed to boot the device to a GUI that is at least partly functional—i.e. so that the device can display a graphical user interface that enables the end-user to use some device function(s). At a minimum, this might be to allow the device to make an emergency voice call.

Default configuration files and data may be automatically copied to the RAM drive from the ROM (read-only memory). These may, for example, allow at least emergency voice calls to be made. Higher levels of functionality are also possible. The ROM is used to hold the binary executable code and factory-programmed data and is never modified in normal use so can be assumed to always hold valid versions of these configuration files.

This is much easier and quicker to implement than redesigning all the code to be able to run without an internal non-volatile memory on the C: drive, and also avoids the need to have a lot of extra error handling and fallback conditions within applications. Typically, it also means that applications can continue to offer much of the normal functionality that requires a C: drive. It is also much more acceptable to end-users than automatically reformatting a corrupt C: drive, since that process would lead to the loss of potentially recoverable user data. The non-volatile memory is typically Flash memory, but the principle of the present invention can be applied to any kind of non-volatile memory that could become corrupted, such as EEPROM, hard drives or any future non-volatile memory products.

Further, the corrupt drive may be automatically moved to a different drive letter to allow subsequent reformatting. A user notification asking if reformatting should take place may then be displayed.

Other display messages may include the following:

a user notification that the temporary drive is in use;

a user notification that save options are disabled;

a user notification that save options are not available;

a user option which, if selected, initiates an attempt to extract data from the corrupt internal non-volatile memory drive.

A second aspect of the invention is a method of enabling a portable computing device to boot up to a functional GUI when its resident operating system is intact but an internal non-volatile memory drive that is normally used to boot up from is found to be corrupt, comprising the step of automatically swapping the corrupt non-volatile memory drive with a temporary RAM drive to enable the operating system to boot.

A third aspect is operating system software, for a portable computing device, comprising an internal non-volatile memory drive that is normally used to boot up the device to a functional GUI, in which the operating system software automatically swaps the non-volatile memory drive with a temporary RAM drive if the non-volatile memory drive is found to be corrupt to enable the operating system to boot.

BRIEF DESCRIPTION OF THE DRAWINGS

An embodiment of the present invention will now be described, by way of further example only, with reference of the accompanying drawings in which.

DETAILED DESCRIPTION

Figure 1:
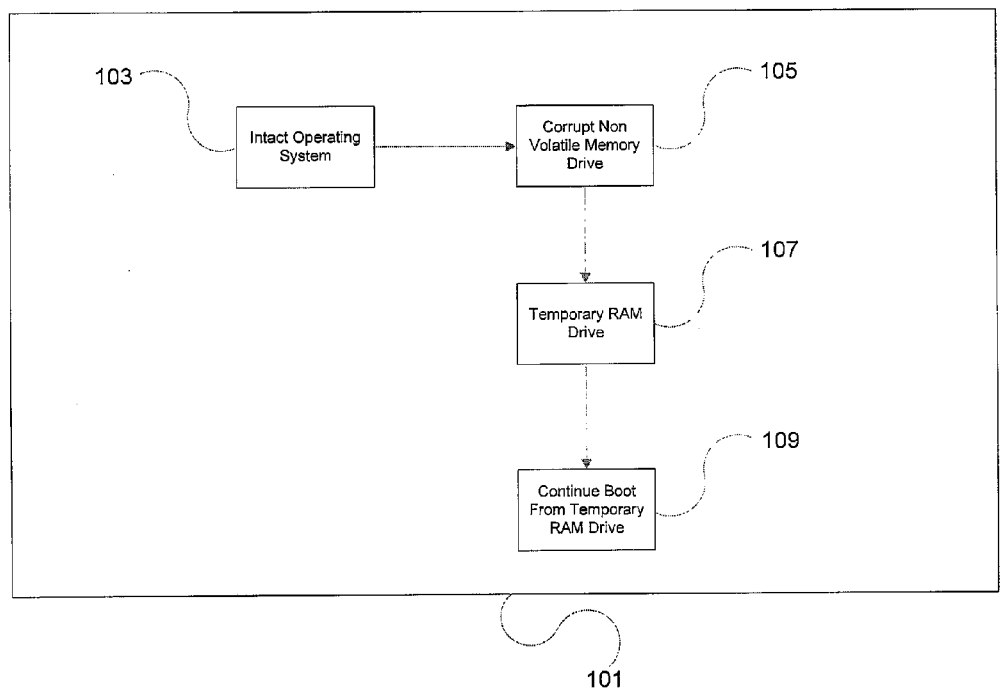
FIG. 1 shows a portable computing device controlled by an Operating System with a corrupt non-volatile drive and a temporary RAM drive.

The invention will be described with reference to an implementation using SymbianOS from Symbian Limited of London, United Kingdom. A SymbianOS based device, as in FIG. 1, 101, in which the SymbianOS operating system is intact, 103, always has a C: drive, which is the internal read/write drive, and the system cannot boot to a functional GUI without a usable C: drive. The C: drive is normally Flash-based, which means that there is always the possibility of it becoming corrupt. This invention envisages a method of replacing a corrupt C: drive 105 with a temporary RAM drive 107 so that a SymbianOS device remains usable 109 in the event of a failure of the C: drive.

Overview

Figure 2:
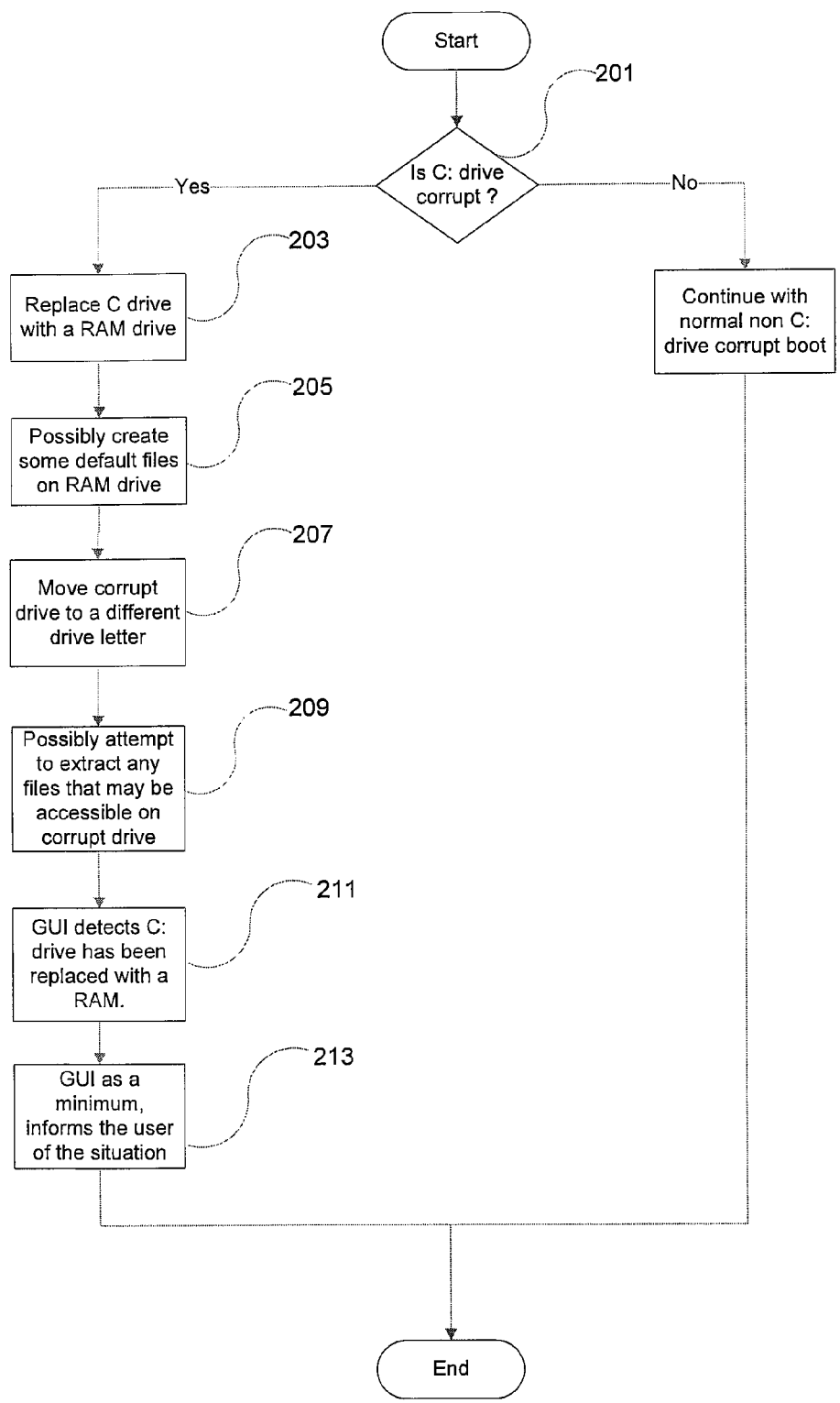
FIG. 2 shows a procedure of replacing a corrupt C: drive.

The procedure is this:
a) Early in boot, check whether the C: drive is corrupt (exactly how this is done will be discussed later), shown as step 201 in FIG. 2.
b) If the drive is corrupt it is replaced with a RAM drive, possibly also creating some default files on it. (These default files may be created programmatically or may be copied from templates held elsewhere in the ROM of the device.), 203 and 205.
c) The corrupt drive is moved to a different drive letter so it can still be accessed to reformat it (and possibly also attempt to extract any files that may still be accessible.), 207 and 209.
d) The GUI will detect that the C: drive has been replaced with a RAM drive and will at least inform the user of the situation, 211 and 213.

What happens next can be configured to the device manufacturer's requirements. The user may have the option to either reformat the drive or return the device to a service centre. A more user-friendly approach would be to allow the user to at least call emergency numbers. Depending on the functionality provided by the device, it might be possible for it to remain largely usable as normal, though of course any data saved will be lost when the device is turned off, so either save options should be disabled from the GUI or the user should be warned that any newly created data will be lost.

When is a Drive "Corrupt"?

We will consider here what is meant by "corrupt" in the context of the present invention. First, the data in the file system can be divided into two parts—user data and metadata. User data is the content of files. Metadata is the information used internally by the file system to record its state. If the user data is corrupt but the metadata is not, then technically the file system is not corrupt because it still knows what state it is in. Realistically though, it is unlikely to be of any use in this condition. It is also possible that the file system is not totally corrupt—as an example Symbian's LFFS file system will enter read-only mode if it is unable to satisfactorily determine its state but existing data is still likely to be valid.

Therefore the likely failure cases are:
a) Drive is totally corrupt, existing data cannot be read and new data cannot be written.
b) Some or all existing user data is corrupt but metadata is valid, so it is still possible to create and write to new files.
c) Some or all existing user data is valid but metadata is ambiguous, truncated or in some way damaged; in this case probably at least some of the existing data can still be accessed but any attempt to write new data could make things worse and may end up in case (a). p0 d) Drive is read only—the same as (c), except that making the drive read-only enforces "no new data".

In practice, it is unlikely that the device will be able to operate usefully in any of these situations. It will want to read existing files, which may be corrupt, and very likely it will also want to write new data. Whatever condition the file system is in, we can call them all "corrupt" with reference to the present invention.

How to Detect Corruption

There are two methods—if the file system performs some sort of integrity scan when it is mounted then if the scan fails the mount should also fail with an error indicating drive corruption. Alternatively some sort of scan of the file system could be invoked to determine its integrity. A spot-check on the validity of files known to be essential for the correct operation of the device is another method to determine whether the drive is corrupt. How corruption should be detected is really outside the scope of this document since it depends on the type of file system, the degree of thoroughness required, the time available, and what files are critical to the system.

Drive Swapping

The swapping of the corrupt drive with a RAM drive must happen early in boot before any code that is dependant on the C: drive. The ideal place in SymbianOS is ESTART, which is the first program run after the kernel and file server have been started. ESTART will do something like this:
TVolumeInfo;

```
TVolumeInfo;
TInt r = TheFs.Volume(info);
if(r == KErrNone)
    {
    // drive says it is ok, so if we want to perform a further
    // integrity check do it now
    r = IntegrityCheck( );
    }
if(r != KErrNone)
    {
    // Drive is corrupt, swap with a RAM drive
    UnmountDriveC( );
    MountRamDriveOnC( );
    MountFlashDriveOnAlternateDrive( );
    CopyDefaultFilesToC( );
    }
```

At the end of this either the C: drive will be the normal Flash drive, or it will be a temporary RAM drive and the Flash will have been moved to a different drive letter.

GUI Behaviour

The GUI must be able to detect that the temporary RAM drive is in use because it has to at least inform the user that the Flash is corrupt. This can be done conveniently in SymbianOS by checking the media type of the C: drive (RFs::Drive function) which will be EMediaRam if the drives have been swapped.

The first thing the GUI will want to do is to tell the user that the drive is corrupt and also offer the opportunity to reformat it—important data may already have been backed up and the user is happy to just reformat.

Further GUI handling will be partly dependent on the device capabilities and partly on the device manufacturer's requirements. The device could be limited to just emergency calls. Or it could be mostly functional but the detection of the RAM drive could be used to disable save options in programs (e.g. calendars and address books) or warn the user that any data saved will be lost when the device is turned off There could even be the option to attempt to extract information from the corrupt drive—for the cases where the drive is still partly accessible—attempting to find address books, calendars etc on the corrupt drive.

Glossary

The following technical terms and abbreviations are used within this specification.

| Term | Definition |
| --- | --- |
| ROM | A non-volatile, non-writeable form of memory. This term can also be used to apply to Flash memory that is used as a non-writeable memory |
| RAM | Random access memory |
| Flash | type of non-volatile storage |
| NOR | type of Flash |
| NAND | type of Flash |
| LFFS | Symbian file system for use on NOR Flash |
| GUI | Graphical User Interface |
| PDA | Portable (or Personal) Digital Assistant (i.e. handheld computer or palmtop) |
| SIM | Subscriber Identity Module, used in GSM phones |
| Estart | In SymbianOS 7.x the program started immediately after the file server |
| File server | In SymbianOS a program that provides basic file services to applications |
| RAM Drive | A section of the device main RAM used as a volatile data storage medium in the form of a file system |

The invention claimed is:

1. An apparatus comprising a non-volatile read/write memory drive and a processor, wherein the processor is configured to cause the apparatus to at least:
use the non-volatile read/write memory drive to boot a single resident operating system of the apparatus, wherein the non-volatile read/write memory drive is normally used to boot up to a functional graphical user interface (GUI) associated with the single resident operating system; and
in an instance in which, during boot, it is determined that the single resident operating system is loaded intact but the non-volatile read/write memory drive is corrupted, automatically swap the non-volatile read/write memory drive with a temporary volatile random access memory (RAM) drive under control of the single resident operating system to thereby enable the single resident operating system to complete the boot.

2. The apparatus of claim 1 in which the non-volatile read/write memory is a flash memory.

3. The apparatus of claim 1 in which the temporary volatile RAM drive allows at least emergency voice calls to be made.

4. The apparatus of claim 1 in which the processor is further configured to cause the apparatus to automatically copy default configuration files to the volatile RAM drive.

5. The apparatus of claim 1 in which the processor is further configured to cause the apparatus to automatically move the corrupt drive to a different drive letter to allow subsequent reformatting.

6. The apparatus of claim 1, wherein the processor is further configured to cause the apparatus to cause display of a user notification asking if reformatting should take place.

7. The apparatus of claim 1, wherein the processor is further configured to cause the apparatus to cause display of a user notification that the temporary volatile RAM drive is in use.

8. The apparatus of claim 1, wherein the processor is further configured to cause the apparatus to cause display of a user notification that save options are disabled.

9. The apparatus of claim 1, wherein the processor is further configured to cause the apparatus to cause display of a user notification that save options are not available.

10. The apparatus of claim 1, wherein the processor is further configured to cause the apparatus to cause display of a user option which, if selected, initiates an attempt to extract data from the corrupt internal non-volatile read/write memory drive.

11. The apparatus of claim 1, wherein the non-volatile read/write memory drive is determined to be corrupted in an instance in which any of the following apply:
(a) existing data cannot be read;
(b) new data cannot be written;
(c) user data is corrupt but metadata is not corrupt;
(d) user data is not corrupt but metadata is corrupt;
(e) it is in a read-only state.

12. An apparatus according to claim 1, wherein the corrupt non-volatile read/write memory drive is unmounted, and the temporary volatile RAM drive is mounted having the same drive letter as was allocated to the corrupt non-volatile read/write memory drive.

13. A method comprising:
loading a single resident operating system;
during boot, determining whether the single resident operating system is intact but that a non-volatile read/write memory drive that is normally used to boot up to a functional graphical user interface (GUI) associated with the single resident operating system is corrupt; and
in an instance in which it is determined that the single resident operating system is intact but the non-volatile read/write memory drive is corrupt, automatically swapping the corrupt non-volatile memory drive with a temporary volatile random access memory (RAM), drive under control of the single resident operating system to thereby enable the single resident operating system to complete the boot.

14. The method of claim 13 in which the non-volatile read/write memory is a flash memory.

15. The method of claim 13 in which the temporary volatile RAM drive allows at least emergency voice calls to be made.

16. The method of claim 13 in which default configuration files are automatically copied to the volatile RAM drive.

17. The method of claim 13 in which the corrupt drive is automatically moved to a different drive letter to allow subsequent reformatting.

18. The method of claim 13, further comprising causing display of a user notification asking if reformatting should take place.

19. The method of claim 13, further comprising causing display of a user notification that the temporary volatile RAM drive is in use.

20. The method of claim 13, further comprising causing display of a user notification that save options are disabled.

21. The method of claim 13, further comprising causing display of a user notification that save options are not available.

22. The method of claim 13, further comprising causing display of a user option which, if selected, initiates an attempt to extract data from the corrupt drive.

23. The method of claim 13 in which the non-volatile read/write memory drive is determined to be corrupted in an instance in which any of the following apply:
   (a) existing data cannot be read;
   (b) new data cannot be written;
   (c) user data is corrupt but metadata is not corrupt;
   (d) user data is not corrupt but metadata is corrupt;
   (e) it is in a read-only state.

24. A method according to claim 13, wherein the swapping comprises unmounting the non-volatile read/write memory drive, and mounting the temporary volatile RAM drive in its place so as to have the same drive letter as was allocated to the corrupt non-volatile read/write memory drive.

25. A computer program product comprising a computer-readable storage medium bearing computer program code embodied therein for use with a computer, the computer program code comprising:
   code configured to load a single resident operating system;
   code configured, during boot, to determine whether the single resident operating system is intact but that a non-volatile read/write memory drive that is normally used to boot up to a functional graphical user interface (GUI) associated with the single resident operating system is corrupt; and
   code configured, in an instance in which it is determined that the single resident operating system is intact but the non-volatile read/write memory drive is corrupt, to automatically swap the corrupt non-volatile memory drive with a temporary volatile random access memory (RAM) drive under control of the single resident operating system to thereby enable the single resident operating system to complete the boot.

\* \* \* \* \*